US012611780B2

(12) United States Patent (10) Patent No.: US 12,611,780 B2
Kurahashi et al. (45) Date of Patent: Apr. 28, 2026

(54) MOBILE ROBOT CONTROL SYSTEM, MOBILE ROBOT CONTROL METHOD, AND COMPUTER READABLE MEDIUM

(71) Applicant: TOYOTA JIDOSHA KABUSHIKI KAISHA, Toyota (JP)

(72) Inventors: Yukinori Kurahashi, Toyota (JP); Shiro Oda, Anjo (JP); Takeshi Matsui, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 361 days.

(21) Appl. No.: 18/490,282

(22) Filed: Oct. 19, 2023

(65) Prior Publication Data

US 2024/0149459 A1 May 9, 2024

(30) Foreign Application Priority Data

Nov. 4, 2022 (JP) ................................. 2022-177466

(51) Int. Cl.
| | |
|---|---|
| *B25J 9/16* | (2006.01) |
| *B25J 1/00* | (2006.01) |
| *B25J 1/02* | (2006.01) |
| *B25J 5/00* | (2006.01) |
| *B25J 19/02* | (2006.01) |
| *G05D 1/00* | (2006.01) |

(52) U.S. Cl.
CPC ............. *B25J 9/1694* (2013.01); *B25J 5/007* (2013.01); *B25J 9/1676* (2013.01); *B25J 19/023* (2013.01); *G05D 1/0214* (2013.01)

(58) Field of Classification Search
CPC ...... B25J 9/1676; G05D 1/637; G05D 1/0214
See application file for complete search history.

(56) References Cited

U.S. PATENT DOCUMENTS

| | | | |
|---|---|---|---|
| 2018/0275663 A1 | 9/2018 | Sonoura | |
| 2021/0100156 A1* | 4/2021 | Iwase ....................... | G01S 17/87 |
| 2023/0054759 A1* | 2/2023 | Robinson .............. | G01S 17/931 |
| 2024/0036579 A1* | 2/2024 | Rands ................... | A01B 69/008 |
| 2025/0348078 A1* | 11/2025 | Ritelli ..................... | B60R 16/08 |

FOREIGN PATENT DOCUMENTS

| | | | | |
|---|---|---|---|---|
| CN | 116382260 A | * | 7/2003 | ........... G05D 1/0206 |
| CN | 111750887 A | * | 10/2020 | ......... G01C 21/3446 |
| CN | 113165173 A | * | 7/2021 | ............. G08C 17/02 |
| JP | 6640779 B2 | | 2/2020 | |
| KR | 20220004852 A | * | 1/2022 | ...... B60W 60/00272 |

* cited by examiner

*Primary Examiner* — Mark A Connolly
(74) *Attorney, Agent, or Firm* — Dinsmore & Shohl LLP

(57) ABSTRACT

A mobile robot control system according to an embodiment is a mobile robot control system configured to control a mobile robot, a shape of the mobile robot having long sides and short sides in a top view, and the mobile robot control system including: an area setting unit configured to set a virtual bumper area defined by a first area and a second area, the first area being defined by a plurality of circles arranged along the long-side direction and the second area being formed by moving the first area in accordance with a moving speed of the mobile robot; and a control unit configured to control the mobile robot so as to decelerate or stop when the nearby object enters the virtual bumper area. Control may be performed using a machine learning model generated by supervised learning or the like.

6 Claims, 10 Drawing Sheets

1

10

HOST MANAGEMENT
APPARATUS

20

22

226 CONVEYED-OBJECT
INFORMATION

21

COMMUNICATION
UNIT  23

222 ROBOT CONTROL
PARAMETER

211

ARITHMETIC
PROCESSING UNIT

RANGE
SENSOR GROUP  24

221 FLOOR MAP

MOVEMENT
INSTRUCTION
EXTRACTION UNIT

CAMERA  25

212 DRIVE
CONTROL UNIT

DRIVE UNIT  26

215 ROUTE
PLANNING UNIT

DISPLAY UNIT  27

218 VIRTUAL BUMPER
SETTING UNIT

OPERATION
RECEIVING UNIT  28

219 OBJECT
DETECTION UNIT

MOBILE ROBOT CONTROL SYSTEM, MOBILE ROBOT CONTROL METHOD, AND COMPUTER READABLE MEDIUM

CROSS REFERENCE TO RELATED APPLICATIONS

This application is based upon and claims the benefit of priority from Japanese patent application No. 2022-177466, filed on Nov. 4, 2022, the disclosure of which is incorporated herein in its entirety by reference.

BACKGROUND

The present disclosure relates to a mobile robot control system, a mobile robot control method, and a program.

An autonomous mobile device disclosed in Patent Literature 1 (Japanese Patent No. 6640779) includes a range sensor that measures a distance from the autonomous mobile device to a close-by obstacle. For each grid in a grid map, a non-presence accuracy indicative of a probability that the obstacle is not present is controlled. Further, the autonomous mobile device includes a contact sensor provided in a bumper.

SUMMARY

In regard to the above autonomous mobile device, it is desirable for it to move without coming into contact with a close-by obstacle (also referred to as a nearby object). However, when a nearby object present near a mobile robot is another mobile robot, a person, etc., its position changes dynamically. Therefore, it is desirable to provide a function (a virtual bumper function) for making the mobile robot stop or decelerate when the mobile robot approaches a nearby object. Therefore, it is desirable that such a virtual bumper function be implemented at a low calculation cost.

The present disclosure has been made in order to solve the above-described problem and provides a mobile robot control system, a mobile robot control method, and a program which can implement a virtual bumper function at a low calculation cost.

A mobile robot control system according to an embodiment is a mobile robot control system configured to control a mobile robot, a shape of the mobile robot having long sides and short sides in a top view, and the mobile robot control system including: a sensor configured to measure a distance from the mobile robot to a nearby object; an area setting unit configured to set a virtual bumper area defined by a first area and a second area, the first area being defined by a plurality of circles arranged along the long-side direction and the second area being formed by moving the first area in accordance with a moving speed of the mobile robot; and a control unit configured to control the mobile robot so as to decelerate or stop when the nearby object is present in the virtual bumper area.

The above mobile robot control system further includes a route setting unit configured to set a travelling route along which the mobile robot moves, in which the second area may be an area formed by moving the first area along the travelling route by a distance corresponding to the moving speed of the mobile robot.

A mobile robot control method according to an embodiment is a method for controlling a mobile robot, a shape of the mobile robot having long sides and short sides in a top view, and the mobile robot control method including: measuring a distance from the mobile robot to a nearby object using a result of detection by a sensor; setting a virtual bumper area defined by a first area and a second area, the first area being defined by a plurality of circles arranged along the long-side direction and the second area being formed by moving the first area in accordance with a moving speed of the mobile robot; and controlling the mobile robot so as to decelerate or stop when the nearby object is present in the virtual bumper area.

The above mobile robot control method may further include setting a travelling route along which the mobile robot moves, in which the second area may be an area formed by moving the first area along the travelling route by a distance corresponding to the moving speed of the mobile robot.

A program according to an embodiment causes a computer to execute a mobile robot control method for controlling a mobile robot, a shape of the mobile robot having long sides and short sides in a top view, and the mobile robot control method including: measuring a distance from the mobile robot to a nearby object using a result of detection by a sensor; setting a virtual bumper area defined by a first area and a second area, the first area being defined by a plurality of circles arranged along the long-side direction and the second area being formed by moving the first area in accordance with a moving speed of the mobile robot; and controlling the mobile robot so as to decelerate or stop when the nearby object is present in the virtual bumper area.

In the above program, the above mobile robot control method may further include setting a travelling route along which the mobile robot moves, and the second area may be an area formed by moving the first area along the travelling route by a distance corresponding to the moving speed of the mobile robot.

According to the present disclosure, it is possible to provide a mobile robot control system, a mobile robot control method, and a program which can implement a virtual bumper function at a low calculation cost.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

The present disclosure will be described hereinafter through an embodiment of the present disclosure. However, the following embodiment is not intended to limit the scope of the present disclosure according to the claims. Further, all the components/structures described in the embodiment are not necessarily indispensable as means for solving the problem.

Figure 1:
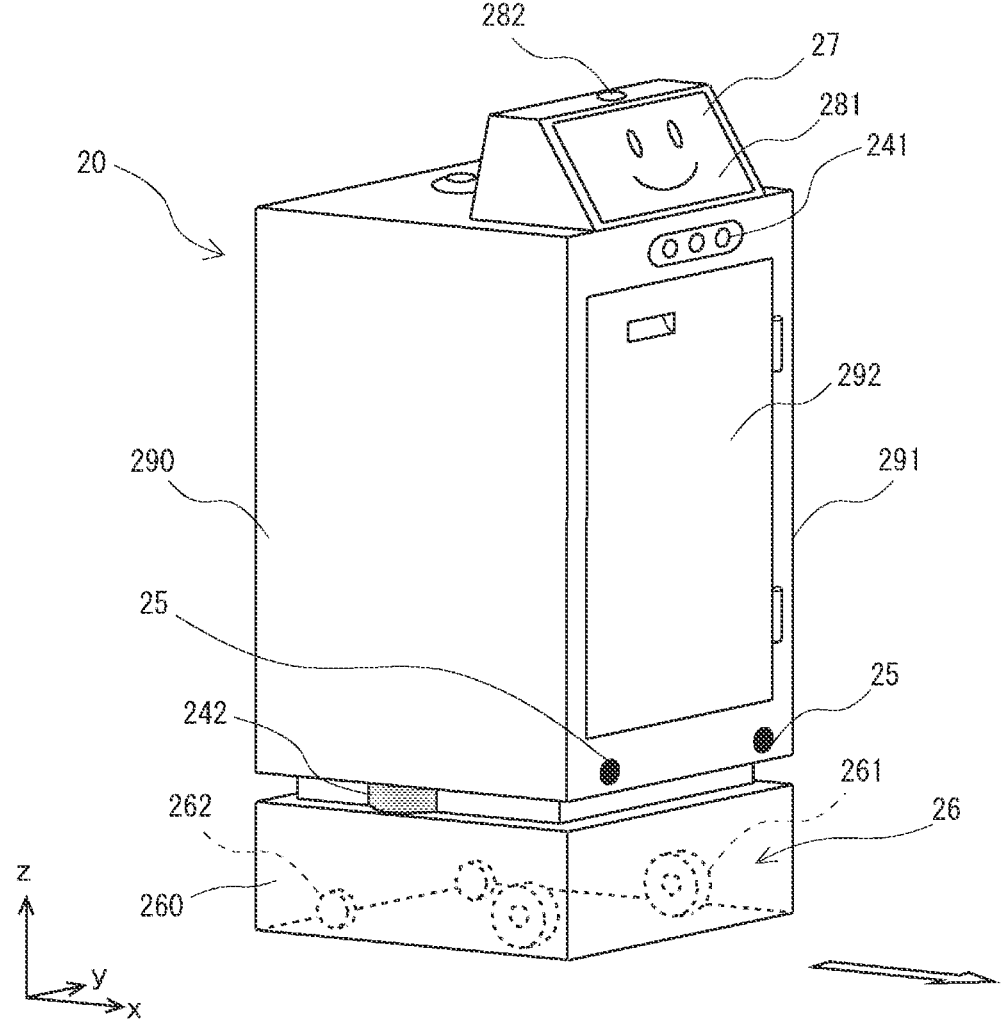
FIG. 1 is a schematic diagram showing an example of a mobile robot according to an embodiment.

FIG. 1 is a perspective view showing a configuration of a mobile robot 20. The mobile robot 20 shown in FIG. 1 is an example of the mobile robot 20, and the mobile robot 20 may have other shapes, appearances, and the like. Note that, in FIG. 1, the x-direction coincides with the forward/backward directions of the mobile robot 20, and the y-direction coincides with the left/right directions of the mobile robot 20. Further the z-direction is the height direction of the mobile robot 20.

For example, the mobile robot 20 is a conveyance robot that conveys, as its task, an object(s) to be conveyed (hereinafter may be referred to as goods). The mobile robot 20 autonomously travels in a medical and welfare facility, such as a hospital, a rehabilitation center, a nursing facility, and a facility in which aged persons live, in order to convey objects to be conveyed. Further, the system according to this embodiment can also be used for commercial facilities such as a shopping mall.

A user stores (i.e., puts) an object to be conveyed in the mobile robot 20 and requests the conveyance thereof. The mobile robot 20 autonomously moves to a set destination so as to convey the goods thereto. That is, the mobile robot performs a task for conveying luggage. In the following description, the place where is the goods are loaded is referred to as a conveyance origin, and the place to which goods are delivered is referred to as a conveyance destination. For example, a user inputs a conveyance destination or the like by using a communication terminal such as a tablet computer or a smartphone. That is, a user may request conveyance by using a user terminal.

The mobile robot 20 autonomously moves to a conveyance destination or a waypoint by autonomous movement control. Further, a description will be given below in accordance with the assumption that each of a plurality of mobile robots performs movement control. However, a host management apparatus that controls a plurality of mobile robots 20 may be provided.

For example, it is assumed that the mobile robot 20 moves in a general hospital having a plurality of clinical departments. The mobile robot 20 conveys supplies, consumable articles, medical instruments, and the like between a plurality of clinical departments. For example, the mobile robot 20 delivers the goods from a nurse station of one clinical department to a nurse station of another clinical department. Alternatively, the mobile robot 20 delivers the goods from a storage room for supplies and medical instruments to a nurse station of a clinical department. Further, the mobile robot 20 delivers medicines prepared in a pharmaceutical department to a clinical department where the medicines are used or a patient who use the medicines.

Examples of the objects to be conveyed include consumable articles such as medicines, bandages, specimens, testing instruments, medical instruments, hospital meals, and stationery. Examples of medical instruments include a sphygmomanometer, a blood transfusion pump, a syringe pump, a foot pump, a nurse-call button, a bed sensor, a low-pressure continuous inhaler electrocardiogram monitor, a medicine infusion controller, an enteral nutrition pump, a respirator, a cuff pressure meter, a touch sensor, an aspirator, a nebulizer, a pulse oximeter, a resuscitator, an aseptic apparatus, and an echo apparatus. Further, the mobile robot 20 may convey meals such as hospital meals and test meals. Further, the mobile robot 20 may convey used apparatuses, used tableware, and the like. When the conveyance destination is located on a floor different from that on which the mobile robot 20 is located, the mobile robot 20 may move to the destination by using an elevator or the like.

The mobile robot 20 includes a body part 290 and a carriage part 260. The body part 290 is mounted on the carriage part 260. Each of the body part 290 and the carriage part 260 includes a rectangular parallelepiped housing, and various components are disposed in the housing. For example, a drive unit 26 is housed in the carriage part 260.

The body part 290 includes a storage box 291 that serves as a storage space, and a door 292 for hermetically close the storage box 291. The storage box 291 includes multi-stage shelves, and the availability state (i.e., the vacancy state) of each stage is managed. For example, the mobile robot 20 can update the available state of each stage by disposing various sensors such as a weight sensor in each stage. The mobile robot 20 autonomously moves and thereby conveys the goods stored in the storage box 291 to the destination. A control box or the like (not shown) may be provided in the housing of the body part 290. Further, the door 292 may be configured so that it can be locked by an electronic key or the like. When the mobile robot 20 arrives at the conveyance destination, a user unlocks the door 292 by the electronic key. Alternatively, when the mobile robot 20 arrives at the conveyance destination, the door 292 may be automatically unlocked.

As shown in FIG. 1, as a range sensor group 24, a front/rear range sensor 241 and a left/right range sensor 242 are provided on the exterior of the mobile robot 20. The mobile robot 20 measures a distance to a nearby object in the front/rear direction of the mobile robot 20 by the front/rear range sensor 241. Further, the mobile robot 20 measures a distance to the nearby object in the right/left direction of the mobile robot 20 by the left/right range sensor 242.

For example, the front/rear range sensor 241 is disposed on each of the front and rear surfaces of the housing of the body part 290. The left/right range sensor 242 is disposed on each of the left-side and right-side surfaces of the housing of the body part 290. Each of the front/rear range sensor 241 and the left/right range sensor 242 is, for example, an ultrasonic range sensor or a laser range finder. The distance to the nearby object is detected. When the distance to the nearby object detected by the front/rear range sensor 241 or the left/right range sensor 242 becomes equal to or shorter than the threshold distance, the mobile robot 20 decelerates or stops.

An area where the mobile robot 20 decelerates or stops when a nearby object approaches the mobile robot is defined as a virtual bumper area. That is, when a nearby object enters the virtual bumper area due to relative movement between the nearby object and the mobile robot 20, the mobile robot 20 stops or decelerates. The virtual bumper area is an area including the mobile robot 20 and its surroundings in a top view.

The drive unit 26 includes a driving wheel(s) 261 and a caster(s) 262. The driving wheel 261 is a wheel for moving the mobile robot 20 forward, backward, to the left, and to the right. The caster 262 is a driven wheel to which no driving force is supplied, and rolls so as to follow the driving wheel 261. The drive unit 26 includes a driving motor(s) (not shown) and drives the driving wheel(s) 261.

For example, the drive unit 26 supports, inside the housing, two driving wheels 261 and two casters 262 all of which are in contact with the surface on which the mobile robot travels. The two driving wheels 261 are arranged so that their rotational axes coincide with each other. Each of the driving wheels 261 is independently rotationally driven (i.e., independently rotated) by motors (not shown). The driving wheels 261 rotate according to control command values provided from a drive control unit 212 shown in FIG. 2. Each of the casters 262 is a trailing wheel, and is disposed in such a manner that its pivoting shaft rotatably supports its wheel at a point which is deviated from the rotating shaft of the driving wheel, and follows the driving wheels in the moving direction of the drive unit 26.

The mobile robot 20, for example, moves in a straight line when the two driving wheels 261 are rotated in the same direction at the same rotational speed, and turns around the vertical axis passing through substantially the center of the two driving wheels 261 when these wheels are rotated in the opposite direction at the same rotational speed. Further, the mobile robot 20 can move forward while turning left or right by rotating the two driving wheels 261 in the same direction at different rotational speeds. For example, the mobile robot 20 turns right by setting the rotational speed of the left driving wheel 261 higher than that of the right driving wheel 261. Conversely, the mobile robot 20 turns left by setting the rotational speed of the right driving wheel 261 higher than that of the left driving wheel 261. That is, the mobile robot 20 can move in a straight line, rotate on its own axis, or turn right or left in an arbitrary direction by individually controlling the rotational direction and the rotational speed of each of the two driving wheels 261.

Further, in the mobile robot 20, a display unit 27 and an operation interface 281 are provided on the upper surface of the body part 290. The operation interface 281 is displayed on the display unit 27. As a user touches the operation interface 281 displayed on the display unit 27, an operation receiving unit 28 can receive an instruction input from the user. Further, an emergency stop button 282 is provided on the upper surface of the display unit 27. The emergency stop button 282 and the operation interface 281 function as the operation receiving unit 28.

The display unit 27 is, for example, a liquid-crystal panel, and displays the face of a character (e.g., a mascot) in an illustration and/or presents (i.e., shows) information about the mobile robot 20 in text or using an icon. It is possible, by displaying the face of the character on the display unit 27, to give people in the area around the mobile robot 20 an impression that the display unit 27 is as if the face of the robot. The display unit 27 and the like provided in the mobile robot 20 can be used as a user terminal.

A camera 25 is disposed on the front surface of the body part 290. In this example, two cameras 25 function as stereo cameras. That is, the two cameras having the same angle of view are horizontally arranged with an interval therebetween. The cameras 25 take images and output them as image data. It is possible to calculate the distance to the subject and the size thereof based on the image data of the two cameras 25. An arithmetic processing unit 21 can detect a person, an obstacle, or the like present ahead the mobile robot 20 in the moving direction by analyzing the images taken by the camera 25. When there is a person, an obstacle, or the like ahead the mobile robot 20 in the traveling direction, the mobile robot 20 moves along the route while avoiding it. Further, the image data of the camera 25 is transmitted to the host management apparatus and the like.

The mobile robot 20 recognizes a nearby object and/or determines its own position by analyzing image data output from the camera 25 and detection signals output from the front/rear range sensor 241 and the left/right range sensor 242. The camera 25 photographs a scene (i.e., an area including objects, people, and the like) ahead of the mobile robot 20 in the traveling direction. As shown in the drawing, the side of the mobile robot 20 on which the camera 25 is disposed is defined as the front of the mobile robot 20. That is, when the mobile robot 20 is moving under normal circumstances, the forward direction of the mobile robot 20 is the traveling direction as indicated by an arrow.

In a top view (an XY plane view), the shape of the mobile robot 20 has long sides and short sides. For example, in a top view, the mobile robot 20 has a rectangular shape. Specifically, in FIG. 2, the X direction is the long-side direction, and the Y direction is the short-side direction. Therefore, the front/rear direction is the long-side direction of the mobile robot 20 and the left/right direction is the short-side direction of the mobile robot 20 based on the direction in which the mobile robot 20 moves by the rotation of the wheels.

Figure 2:
FIG. 2 is a control block diagram showing a control system of the mobile robot according to the embodiment.

A control system of the mobile robot 20 is disposed in the body part 290 of the mobile robot 20. The control system of the mobile robot 20 will be described with reference to FIG. 2. FIG. 2 is a control block diagram showing a control system 1 for the mobile robot 20. The control system 1 includes a host management apparatus 10 and the mobile robot 20. Note that although the control system 1 includes a plurality of mobile robots 20, only one mobile robot is shown in FIG. 2 for the sake of simplification. The plurality of mobile robots 20 have similar configurations.

The mobile robot 20 includes the arithmetic processing unit 21, a storage unit 22, a communication unit 23, proximity sensors (e.g., the range sensor group 24), the camera 25, the drive unit 26, the display unit 27, and the operation receiving unit 28. Note that although only typical processing blocks provided in the mobile robot 20 are shown in FIG. 2, the mobile robot 20 may include a number of other processing blocks (not shown).

The communication unit 23 is a communication interface for communicating with other mobile robots and the host management apparatus 10. The communication unit 23 communicates with the host management apparatus 10 and the like, for example, by using a radio signal. In this case, the host management apparatus 10 is provided so that it can communicate with the mobile robot 20 by a wireless LAN or the like. The mobile robot 20 and the host management apparatus 10 transmit and receive various types of data. Further, the mobile robot 20 may move based on various types of data from the host management apparatus 10. That is, part of processing described later may be performed by the host management apparatus 10. Further, the mobile robot 20 can communicate with other mobile robots directly or through the host management apparatus 10 or the like.

The host management apparatus 10 is a computer including a processor, a memory, and the like, and functions as a server apparatus that collects data from a plurality of mobile robots 20. For example, the host management apparatus 10 can be implemented as an apparatus capable of executing a program, such as a Central Processing Unit (CPU) of a computer. Further, various types of functions can be implemented by the program. The host management apparatus performs processing for controlling the mobile robot 20 based on data from the mobile robot 20. Therefore, part of the processing described later may be performed by the host management apparatus 10.

The range sensor group 24 is, for example, composed of proximity sensors, and outputs proximity object distance information indicating a distance to an object or a person present in the area around the mobile robot 20. The range sensor group 24 includes a range sensor such as a lidar. By scanning a direction in which an optical signal is emitted, a distance from the mobile robot to a nearby object can be measured. Further, a nearby object may be recognized from point cloud data detected by a range sensor or the like. The camera 25 takes, for example, an image(s) that is used to recognize the situation around the mobile robot 20. Further, the camera 25 can also photograph, for example, position markers provided on the ceiling of the facility or the like. The mobile robot 20 may recognize its own position by using the position markers.

The drive unit 26 drives the driving wheel(s) 261 (see FIG. 1) provided in the mobile robot 20. Note that the drive unit 26 may include an encoder(s) that detects the number of rotations of the driving wheel(s) or the driving motor(s) thereof. The position (the current position) of the mobile robot 20 itself may be estimated according to the output of the encoder. The mobile robot 20 detects its own current position and transmits it to other mobile robots and the like. The mobile robot 20 estimates its position on a floor map 221 by odometry or the like.

The display unit 27 and the operation receiving unit 28 are implemented by a touch panel display. The display unit 27 displays a user interface screen (e.g., a user interface window) that serves as the operation receiving unit 28. Further, the display unit 27 can display information indicating the destination of the mobile robot 20 and/or the state of the mobile robot 20. The operation receiving unit 28 receives an operation from a user. The operation receiving unit 28 includes various switches provided in the mobile robot 20 in addition to the user interface screen displayed on the display unit 27.

The arithmetic processing unit 21 performs calculation for controlling the mobile robot 20. The arithmetic processing unit 21 can be implemented, for example, as an apparatus capable of executing a program, such as a central processing unit (CPU) of a computer. Further, various types of functions can be implemented by programs. The arithmetic processing unit 21 includes a movement instruction extraction unit 211, the drive control unit 212, a route planning unit 215, a virtual bumper setting unit 218, and an object detection unit 219. Note that although only typical processing blocks provided in the arithmetic processing unit 21 are shown in FIG. 2, the arithmetic processing unit 21 may include other processing blocks (not shown).

The route planning unit 215 plans a route for the mobile robot 20. When a user inputs a conveyance request, the route planning unit 215 plans a route for conveying the goods to a conveyance destination (destination) based on conveyance request information. The route planning unit 215 searches for a route from the current location to the conveyance destination. For example, by referring to the floor map 221 described later, the route planning unit 215 searches for a route from the current location to the conveyance destination. As a matter of course, when there is a waypoint before the destination, the route planning unit 215 searches for a route from the current location to the waypoint and a route from the waypoint to the destination. For example, when a plurality of goods are conveyed to conveyance destinations different from each other at the same time, the conveyance destination of the goods to be conveyed first is set as a waypoint.

Further, the route planning unit 215 sets passing points along the route. The start point is, for example, the current position of the mobile robot 20, the conveyance destination of the immediately preceding conveyance task, the place where the goods (i.e., the object that needs to be conveyed from there) are received, or the like. The destination is the conveyance destination of the goods, a waiting place, a charging place, or the like. The route planning unit 215 sets passing points on the floor map 221.

The route planning unit 215 may plans a route in accordance with a congestion situation of a facility. For example, when a congestion situation of a facility is detected by a monitoring camera or the like, the route planning unit 215 searches for a route so as to avoid the congested area. By doing so, the mobile robot 20 can be moved efficiently. Further, the host management apparatus 10 may perform at least part of the processing of the route planning unit 215.

The movement instruction extraction unit 211 extracts movement instructions from a control signal. For example, the movement instruction includes information about the next passing point. For example, the control signal may include coordinates of each of the passing points and information about the passing order of the passing points. Further, the movement instruction extraction unit 211 extracts these pieces of information as movement instructions.

Further, the movement instruction may include information indicating that to the mobile robot 20 can move to the next passing point. If a passage is narrow, two or more mobile robot 20 may not pass each other. Further, a passage may be temporarily blocked. In such a case, the control signal includes an instruction to stop the mobile robot 20 at a passing point in front of the place where the mobile robot 20 should stop. Then, after the other mobile robot 20 has passed or after it becomes possible to pass the passage, the host management apparatus or the like outputs, to the mobile robot 20, a control signal for informing the mobile robot 20 that it can move through the passage. As a result, the mobile robot 20, which has temporarily stopped, starts to move again.

The drive control unit 212 controls the drive unit 26 so that the mobile robot 20 moves based on the movement instruction provided from the movement instruction extraction unit 211. For example, the drive unit 26 include a driving wheel(s) 261 that rotates according to a control command value provided from the drive control unit 212. The movement instruction extraction unit 211 extracts a movement instruction so that the mobile robot 20 moves toward a passing point received from the host management apparatus 10. Then, the drive unit 26 rotationally drives the driving wheel(s) 261. The mobile robot 20 autonomously moves toward the next passing point. By doing so, the mobile robot 20 passes through passing points in order (i.e., one after another) and arrives at the conveyance destination. Further, the mobile robot 20 may estimate its own position and transmit a signal indicating that it has passed the passing point to the host management apparatus 10. In this way, the host management apparatus 10 can manage the current position and the conveyance status of each mobile robot 20.

The virtual bumper setting unit 218 sets a virtual bumper area for the mobile robot 20. As described above, the virtual bumper area is the area including the mobile robot 20 and its surroundings. A distance threshold for setting the virtual bumper is set in a robot control parameter 222 described later. Therefore, the virtual bumper setting unit 218 sets an area within a predetermined distance from the external shape of the mobile robot 20 as the virtual bumper area. The virtual bumper setting unit 218 sets the virtual bumper area in the XY plane (horizontal plane).

Further, the virtual bumper setting unit 218 can set the virtual bumper area in a variable manner. For example, the virtual bumper setting unit 218 may change the size and the shape of the virtual bumper area in accordance with a moving speed, a moving direction, a position on the map, and the like of the mobile robot 20.

The object detection unit 219 detects that a nearby object is present within the virtual bumper area. The object detection unit 219 can detect whether or not a nearby object is present in accordance with a result of detection by a range sensor. When the object detection unit 219 detects that a nearby object is present in the virtual bumper area, it outputs a detection signal to the drive control unit 212.

In the storage unit 22, the floor map 221, the robot control parameters 222, and conveyed-object information 226 are stored. The information shown in FIG. 2 is a part of the information stored in the storage unit 22, and includes information other than the floor map 221, the robot control parameters 222, and the conveyed-object information 226 shown in FIG. 2.

The floor map 221 is map information of a facility where the mobile robot moves. The floor map 221 may be a map prepared in advance. Further, the floor map 221 may be a map generated from information obtained from the mobile robot 20, or a map generated by adding map correction information generated from the information obtained from the mobile robot 20 to a basic map prepared in advance. Further, the floor map 221 may not be map information for the whole facility, but may be map information for a part of the area in which the mobile robot 20 is supposed to move. The floor map 221 includes information about walls, doors, stairs, elevators, and the like of the facility.

The robot control parameters 222 are parameters for operating the mobile robot 20. The robot control parameters 222 include, for example, a threshold distance to a nearby object. For example, the robot control parameters 222 include information indicating the shape, the size, and the like of the virtual bumper area. When the virtual bumper area is made to be variable, the robot control parameters 222 include information about a plurality of settings. Further, the robot control parameters 222 include an upper limit value of the speed of the mobile robot 20.

The conveyed-object information 226 includes information about the contents (the type) of an object to be conveyed, the conveyance origin, the conveyance destination, and the like. The conveyed-object information may include information indicating a status such as "during conveyance", "before conveyance" ("before loading"), and "conveyed". In the conveyed-object information 226, the above-described information is associated with each of goods.

The drive control unit 212 decelerates or stops the mobile robot 20 in response to a detection signal from the object detection unit 219. That is, the drive control unit 212 refers to the robot control parameters 222, and when the distance indicated by the distance information obtained from the range sensor group 24 decreases beyond the threshold distance, makes the mobile robot 20 stops or decelerates. When a nearby object relatively approaches the mobile robot 20 and enters the virtual bumper area, the mobile robot 20 decelerates or stops. In this way, when other mobile robots, people, etc. are present near the mobile robot 20, contact between the mobile robot 20 and them can be prevented.

The drive control unit 212 controls the drive unit 26 so that the mobile robot 20 travels at a speed equal to or lower than the upper limit value of the speed thereof. The drive control unit 212 limits the rotational speed of the driving wheel so that the mobile robot 20 does not move at a speed equal to or higher than the upper limit value of the speed thereof.

The virtual bumper setting unit 218 serves as an area setting unit that sets a virtual bumper area. The range sensor group 24, which is composed of range sensors, detects a distance from the mobile robot 20 to a nearby object. The object detection unit 219 determines whether or not a nearby object is present in the virtual bumper area based on a result of the detection by the range sensor group 24. When the object detection unit 219 detects that a nearby object is present in the virtual bumper area, the drive control unit 212 controls the drive unit 26 so that the mobile robot 20 decelerates or stops.

Figure 3:
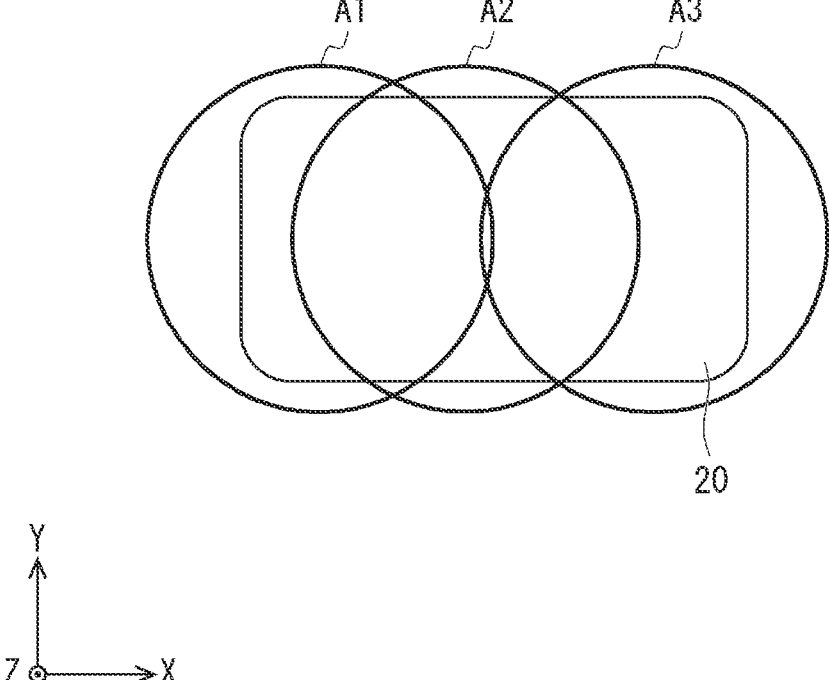
FIG. 3 is a top view for explaining a virtual bumper area of the mobile robot.

The virtual bumper setting unit 218 sets a virtual bumper area around the mobile robot 20. In a top view, the virtual bumper area is an area formed of a set of a plurality of circles. The virtual bumper area will be described with reference to FIG. 3. FIG. 3 is a top view schematically showing the virtual bumper area set in the mobile robot 20. As shown in FIG. 3, areas A1 to A3 are set in the mobile robot 20 as the virtual bumper areas. That is, a set of a plurality of circular areas is a virtual bumper area A. The virtual bumper area A is an area including therein the entire mobile robot 20. Note that the mobile robot 20 has a rectangular shape in which the X direction is the long-side direction and the Y direction is the short-side direction.

In a top view, the areas A1 to A3 are circular and of the same size. The areas A1 to A3 are circular and of the same diameter, and their center positions are different from each other. The areas A1 to A3 are arranged along the long-side direction of the mobile robot 20.

For example, in a top view, the area A2 coincides with the center of the mobile robot 20. The area A1 has a circular shape formed by shifting the area A2 in the −X direction. The area A2 partially overlaps the area A1. The area A3 has a circular shape formed by shifting the area A2 in the +X direction. The area A2 partially overlaps the area A3.

In the X direction, the distance between the center of the area A1 and the center of the area A2 is equal to the distance between the center of the area A3 and the center of the area A2. That is, in the X direction, three circular areas A1 to A3 are arranged at equal intervals. In the Y direction, the positions of the centers of the areas A1 to A2 are the same. The diameter of the area A1 is larger than the size of the mobile robot 20 in the short-side direction thereof and smaller than the size of the mobile robot 20 in the long-side direction thereof.

Figure 4:
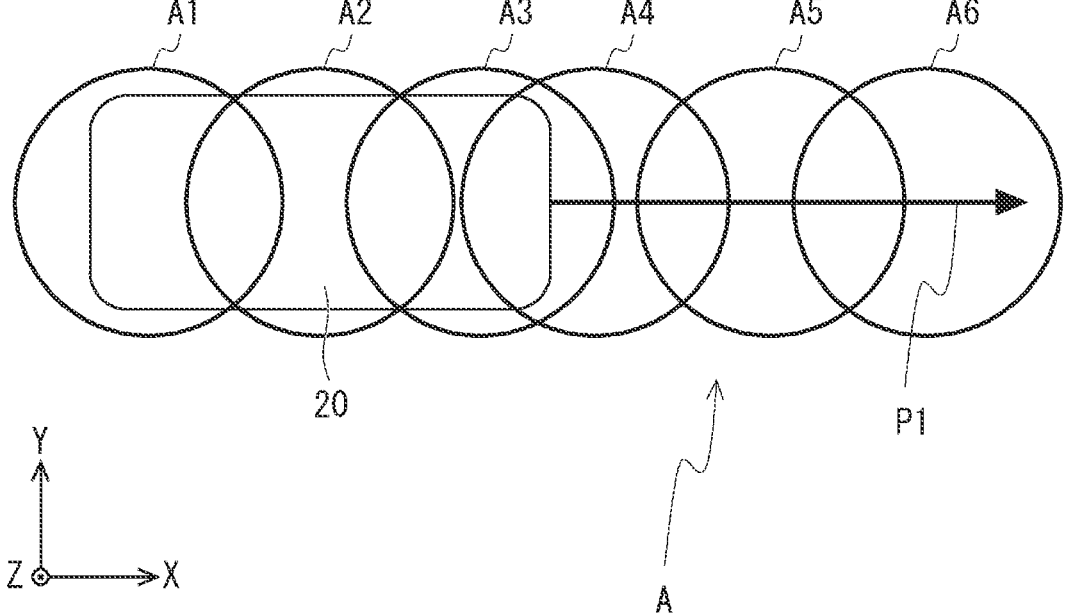
FIG. 4 is a top view schematically showing the virtual bumper area of the mobile robot when it travels straight forward.

Further, the virtual bumper setting unit 218 moves the areas A1 to A3, which are a plurality of circular areas, in accordance with the moving speed. The virtual bumper setting unit 218 sets an area formed by moving the areas A1 to A3 in the traveling direction of the mobile robot 20 as the virtual bumper area. An example of the virtual bumper area A will be described with reference to FIG. 4. FIG. 4 is a top view schematically showing the virtual bumper area A when the mobile robot 20 travels straight forward.

In FIG. 4, the mobile robot 20 is traveling along a path P1. Specifically, the mobile robot 20 is traveling straight in the +X direction. The virtual bumper setting unit 218 sets, as the virtual bumper area A, areas A4 to A6 formed by moving the areas A1 to A3 in the +X direction. An area formed by moving the area A1 in accordance with the moving speed of the mobile robot 20 is the area A4. An area formed by moving the area A2 in accordance with the moving speed of the mobile robot 20 is the area A5. An area formed by moving the area A3 in accordance with the moving speed of the mobile robot 20 is the area A6. The area A3 partially overlaps the area A4. The areas A1 to A6 are circular and of the same size. A set of the areas A1 to A6 is the virtual bumper area A. That is, when the object detection unit 219 detects a nearby object in any of the areas A1 to A6, the mobile robot 20 decelerates or stops.

The area A4 is an area formed by moving the area A1 along the path P1. The area A5 is an area formed by moving the area A2 along the path P1. The area A6 is an area formed by moving the area A3 along the path P1. For example, the movement distance between the area A1 and the area A4 is equal to the movement distance between the area A2 and the area A5. The movement distance between the area A1 and the area A4 is equal to the movement distance between the area A3 and the area A6.

The above movement distances can be set in accordance with the moving speed of the mobile robot 20. That is, the higher the moving speed, the longer the movement distance. The movement distances among the areas A1 to A3 vary depending on the moving speed. FIG. 10 is a diagram showing the virtual bumper area A when the moving speed is high as compared to the case of FIG. 9. When the moving speed is high, the areas A4 to A6 move to the position where the movement distance is longer. By doing so, the virtual bumper area can be set more appropriately.

When an area defined by the areas A1 to A3 is a first area and an area defined by the areas A4 to A6 is a second area, an area formed by moving the first area in accordance with the moving speed is the second area. The second area is an area formed by moving the first area along the path P1. The virtual bumper area A is composed of the first area and the second area.

Figure 5:
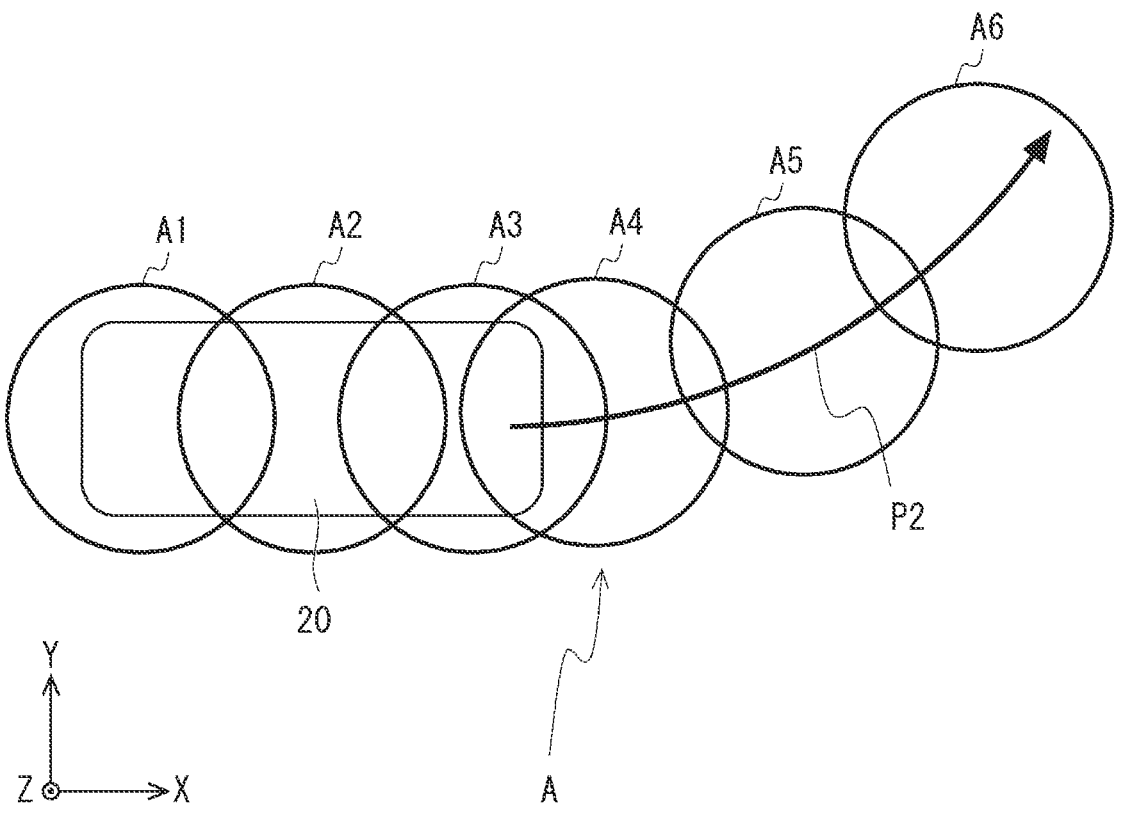
FIG. 5 is a top view schematically showing the virtual bumper area of the mobile robot when it makes a left turn.

FIG. 5 is a top view schematically showing the virtual bumper area A when the mobile robot 20 is making a left turn. The mobile robot 20 is moving along a path P2. Specifically, the mobile robot 20 is moving forward while making a left turn. The rotational speed of the right driving wheel is higher than that of the left driving wheel. Therefore, the mobile robot 20 is moving diagonally forward to the left.

The virtual bumper setting unit 218 sets, as the virtual bumper area A, the areas A4 to A6 formed by moving the areas A1 to A3 in the direction in which the mobile robot 20 moves. An area formed by moving the area A1 in accordance with the moving speed of the mobile robot 20 is the area A4. An area formed by moving the area A2 in accordance with the moving speed of the mobile robot 20 is the area A5. An area formed by moving the area A3 in accordance with the moving speed of the mobile robot 20 is the area A6. A set of the areas A1 to A6 is the virtual bumper area A. That is, when the object detection unit 219 detects a nearby object in any of the areas A1 to A6, the mobile robot 20 decelerates or stops.

The area A4 is an area formed by moving the area A1 along the path P2. The area A5 is an area formed by moving the area A2 along the path P2. The area A6 is an area formed by moving the area A3 along the path P2. The center of each of the areas A4 to A6 is located on the path P2. When an area defined by the areas A1 to A3 is a first area and an area defined by the areas A4 to A6 is a second area, an area formed by moving the first area in accordance with the moving speed is the second area. The above movement distances can be set in accordance with the moving speed of the mobile robot 20. The second area is an area formed by moving the first area along the path P2.

Figure 6:
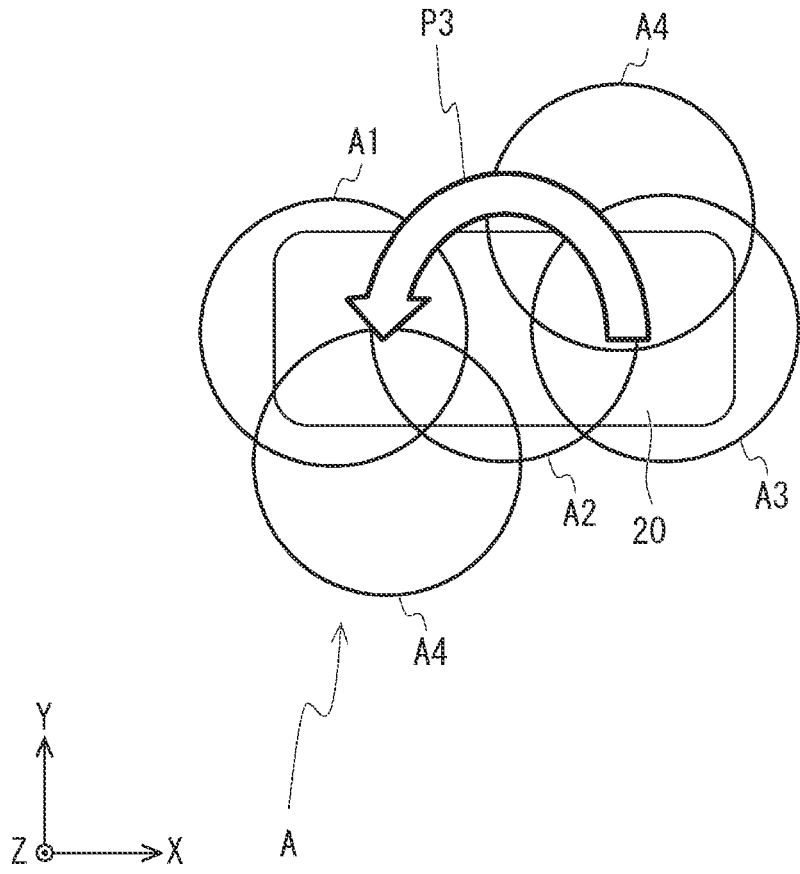
FIG. 6 is a top view schematically showing the virtual bumper area of the mobile robot when it turns.

FIG. 6 is a top view schematically showing the virtual bumper area A when the mobile robot 20 is turning in place. The mobile robot 20 is turning along a path P3. The turning center of the mobile robot 20 coincides with the center of the area A2.

The area A4 is an area formed by moving the area A1 along the path P3. The area A1 and the area A4 are located on a circle whose center is located on the turning center of the mobile robot. The area A6 is an area formed by moving the area A3 along the path P3. The area A3 and the area A6 are located on a circle whose center is located on the turning center of the mobile robot. Since the center of the area A2 coincides with the center of the turning in place, the area A5 and the area A2 are located at the same position. That is, when the mobile robot turns in place, the center of the area A5 coincides with the center of the area A2. When the turning center of the mobile robot 20 coincides with the center of the area A2, it is not required to move the area A2. A set of the areas A1, A2, A3, A4, and A6 is the virtual bumper area A.

As described above, an area composed of a plurality of circles is set as the virtual bumper area A. By doing so, a calculation cost for implementing the virtual bumper function can be reduced. That is, by determining the center of each circle, the virtual bumper area can be set easily. By a circular approximation of the area, the virtual bumper can be implemented at a low calculation cost. The object detection unit 219 calculates a distance from the center of the circular area to an obstacle and determines whether or not the calculated distance from the center of the circular area to the obstacle is less than or equal to the radius. That is, the object detection unit 219 determines whether or not the distance from the center of each circle to the obstacle is less than or equal to a threshold. Therefore, the virtual bumper function can be implemented by simple processing.

On the other hand, when the virtual bumper area is set in accordance with the shape of the mobile robot 20, a calculation cost increases. For example, when the mobile robot 20 has a rectangular shape having long and short sides in a top view, the external shape of the virtual bumper area is required to be calculated. When the mobile robot 20 has a rectangular shape in a top view, a calculation cost for the virtual bumper function increases. Further, when the shape of the mobile robot 20 is more complicated, a calculation cost increases greatly.

Further, the areas A4 to A6 formed by moving the areas A1 to A3 composed of a plurality of circles form the virtual bumper area. By doing the above, when a nearby object is present ahead of the mobile robot 20 in the travelling direction thereof, the mobile robot 20 decelerates or stops. Therefore, the virtual bumper function can be properly operated. Note that the number of circular areas to be moved is not limited to three. The number of circular areas can be determined in accordance with the aspect ratio or the like of the mobile robot 20. The virtual bumper setting unit 218 may set the virtual bumper area by moving two circular areas, or may set the virtual bumper area by moving four or more circular areas.

Figure 7:
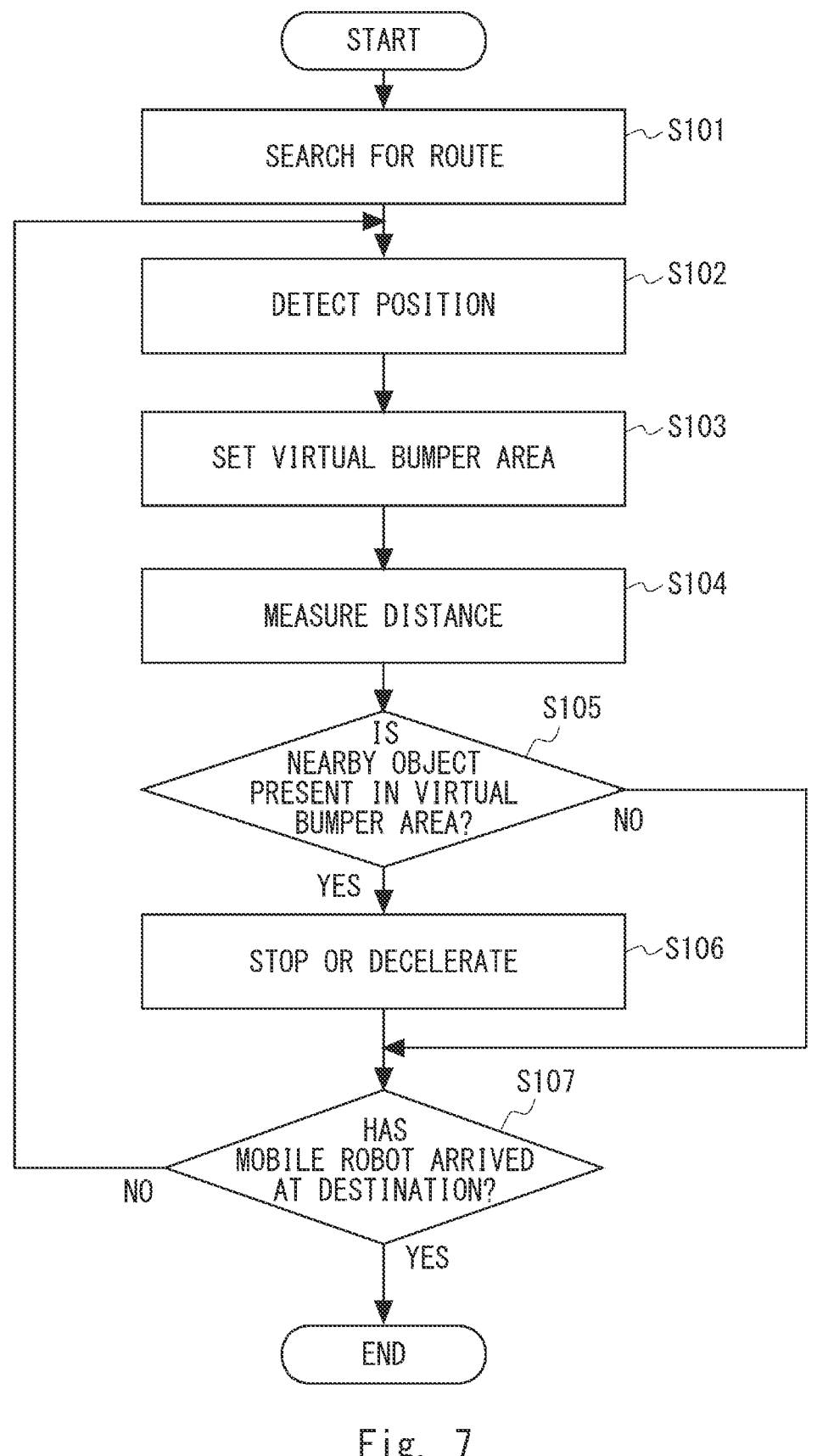
FIG. 7 is a flowchart showing a method for controlling a mobile robot.

A method for controlling a mobile robot according to this embodiment will be described with reference to FIG. 7. FIG. 7 is a flowchart showing a method for controlling the mobile robot 20.

First, the route planning unit 215 searches for a route to a destination (S101). The route planning unit 215 searches for a route by referring to the floor map 221. The destination may be a conveyance destination or a waypoint of an object to be conveyed, or it may be a passing point before it.

Next, the mobile robot 20 detects a position of the mobile robot 20 (S102). For example, the mobile robot 20 can detect its current position using odometry. Alternatively, the mobile robot 20 can detect its position based on a result of the detection by each sensor.

The virtual bumper setting unit 218 sets the virtual bumper area A based on its current position (S103). As shown in FIG. 4, FIG. 5, etc., the virtual bumper setting unit 218 sets the areas A1 to A3 relative to its position. Further, the virtual bumper setting unit 218 calculates the areas A4 to A6 to be formed by moving the areas A1 to A3 along the route. In this way, the virtual bumper setting unit 218 sets the virtual bumper area A including the areas A1 to A6.

The range sensor group 24 measures a distance from the mobile robot 20 to a nearby object (S104). Then the object detection unit 219 determines whether or not a nearby object is present in the virtual bumper area A (S105). When a nearby object is present in the virtual bumper area A (YES in S105), the mobile robot 20 stops or decelerates (S106). When no nearby object is present in the virtual bumper area A (NO in S105), the process proceeds to Step S107. That is, the mobile robot 20 travels while maintaining its speed.

Then, the mobile robot 20 determines whether or not it has arrived at the destination (S107). When the mobile robot 20 has not arrived at the destination (NO in S107), the process returns to Step S102 and the above processes are repeated. That is, the mobile robot 20 detects its latest position and performs the above processes again. When the mobile robot 20 arrives at the destination (YES in S107), the process ends. That is, the loop processes starting from Step S102 are repeated until the mobile robot 20 arrives at the destination.

By doing the above, the virtual bumper function can be implemented at a low calculation cost. Further, the processing order of the control method according to this embodiment is not limited to the one shown in FIG. 7. Further, each time the position of the mobile robot 20 is updated, the virtual bumper area A is updated. Therefore, since an appropriate virtual bumper area can be set, the mobile robot 20 can move efficiently and appropriately.

The movement distance that the areas A1 to A3 are moved along the route can be set by the moving speed and simulation time. The simulation time can be determined by the time required for the loop processes shown in FIG. 7. For example, a time interval at which the mobile robot 20 detects its position is the simulation time. Then the virtual bumper setting unit 218 simulates the moving position after the simulation time elapses.

Figure 8:
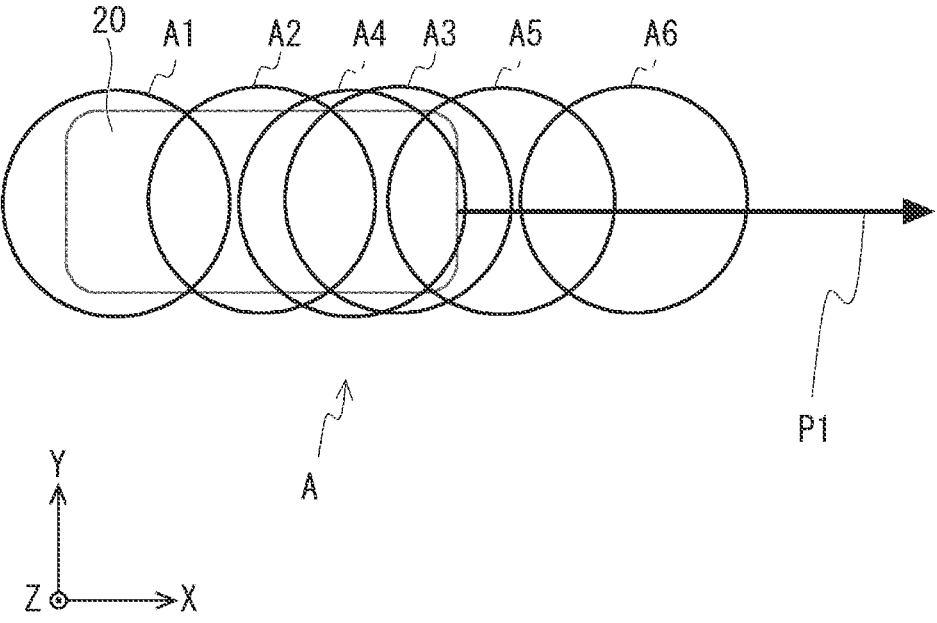
FIG. 8 is a top view schematically showing a virtual bumper area in a case of a short simulation time.
Figure 9:
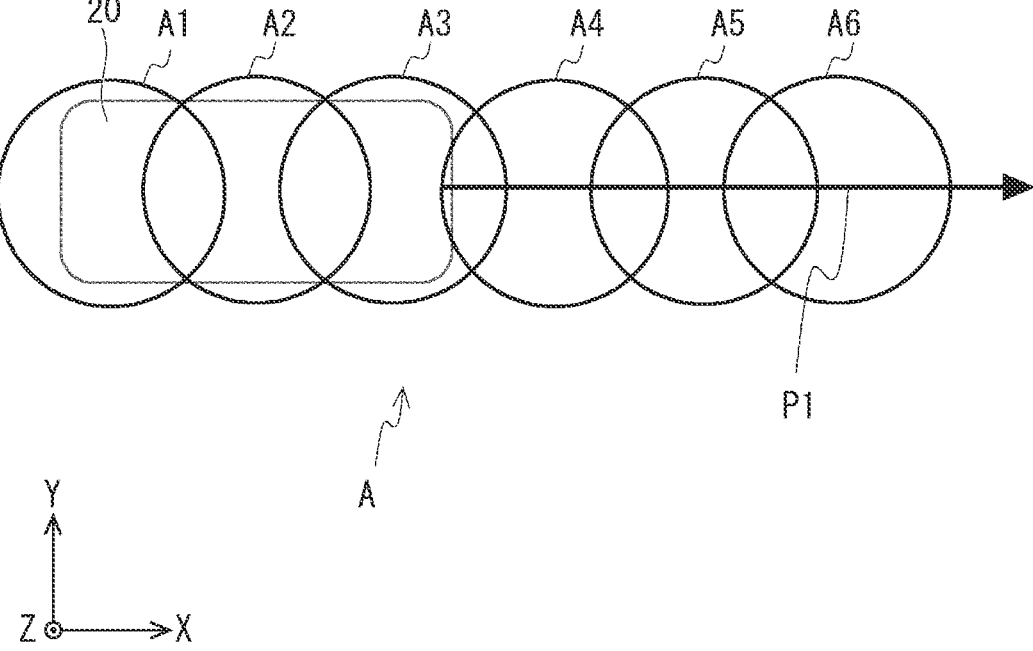
FIG. 9 is a top view schematically showing the virtual bumper area in a case of a reference simulation time.
Figure 10:
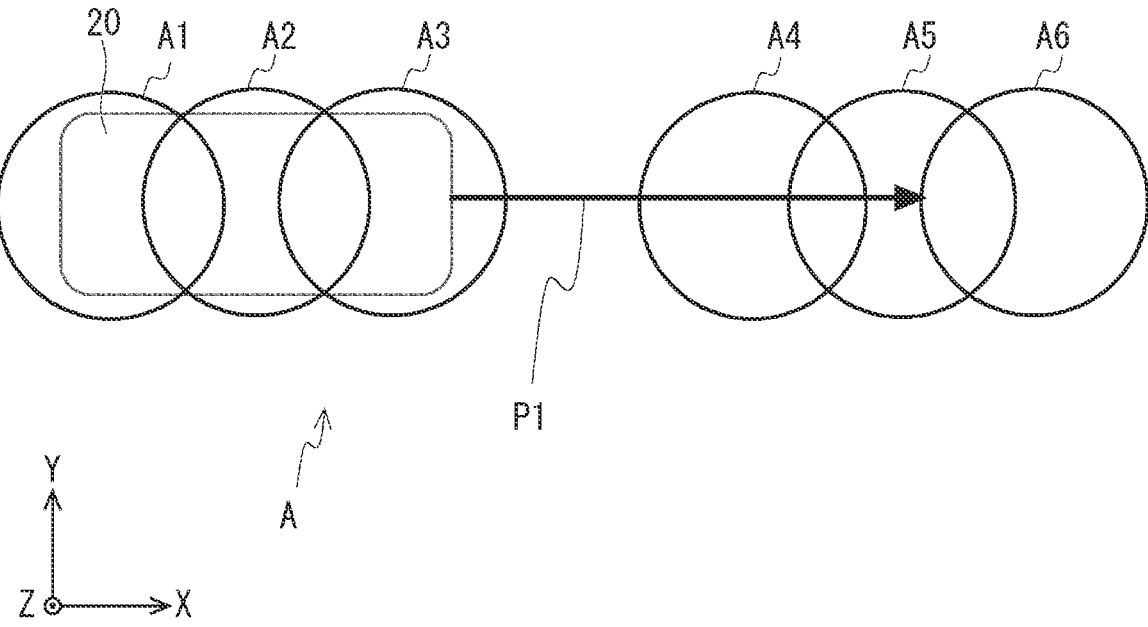
FIG. 10 is a top view schematically showing a virtual bumper area in a case of a long simulation time.

Each of FIGS. 8 to 10 is a top view schematically showing the virtual bumper area A when a simulation time dt is changed. A simulation time is changed using the simulation time in FIG. 9 as a reference (middle) simulation time. FIG. 8 is a diagram showing the virtual bumper area A when the simulation time dt is shorter than that in FIG. 9. FIG. 10 is a diagram showing the virtual bumper area A when the simulation time dt is longer than that in FIG. 9. Note that the mobile robot 20 is traveling straight along the path P1.

The virtual bumper setting unit 218 sets the areas A4 to A6 by moving the areas A1 to A3 by the product of the simulation time dt and a moving speed v. The virtual bumper setting unit 218 performs a simulation in which the areas A1 to A3 are moved ahead of the mobile robot 20 in the moving direction thereof by a distance (dt*v). As shown in FIG. 8, when the simulation time dt is short, the movement distance is short. As shown in FIG. 10, when the simulation time dt is long, the movement distance is long.

In this way, the virtual bumper setting unit 218 can move the areas A4 to A6 to a place to which the mobile robot 20 is to be moved after the simulation time. That is, the mobile robot 20 can predict the position of the next place to which the mobile robot 20 is to be moved. Therefore, the virtual bumper setting unit 218 can set the virtual bumper area A appropriately. Further, since the moving speed is 0 when the mobile robot 20 is stopped, the virtual bumper area as shown in FIG. 3 is set. Alternatively, when the mobile robot 20 is stopped, it is not required to set the virtual bumper area.

The control method according to this embodiment may be performed by the host management apparatus 10 or by the edge device (the mobile robot 20). Further, the mobile robot 20 and the host management apparatus 10 may perform the control method in corporation with each other. That is, the robot control system according to this embodiment may be installed in the mobile robot 20. Alternatively, at least a part or the whole control system may be installed in an apparatus other than the mobile robot 20, e.g., in the host management apparatus 10.

The control system that controls the mobile robot 20 may be mounted on the mobile robot or may be mounted on an apparatus other than the mobile robot. Further, the sensor for measuring the distance from the mobile robot to an object is not limited to a range sensor mounted on the mobile robot. For example, a sensor provided in an environment where the mobile robot 20 moves may be used. For example, a camera or a lidar provided on a wall surface, a ceiling, or the like may be used as a sensor. For example, when a monitoring camera or the like captures an image of a mobile robot and an object, it calculates a distance between the mobile robot and the object based on the captured image. Note that the sensor may be an RGB camera, a depth camera, a stereo camera, or any other type of camera. Further, the arithmetic processing unit 21 or the host management apparatus 10 analyzes the captured image, whereby it is possible to detect the distance from the mobile robot to the nearby object. The arithmetic processing unit 21 or the host management apparatus 10 can measure the distance from the mobile robot 20 to the nearby object based on a result of the detection by the sensor.

The host management apparatus 10 is not limited to a single physical apparatus, and may instead be disposed in a plurality of apparatuses in a distributed manner. That is, the host management apparatus 10 may include a plurality of memories and a plurality of processors. Control may be performed using a machine learning model generated by supervised learning or the like. For example, a machine learning model may be used for processing such as route searching and object detection.

Further, some or all of the above-described processes performed by the host management apparatus 10, the mobile robot 20, or the like can be implemented as a computer program. The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described embodiments, and they may be modified as appropriate without departing from the scope and spirit of the disclosure. For example, although a system in which a conveyance robot autonomously moves in a hospital has been described in the above-described embodiments, the above-described system also makes it possible to convey certain articles as luggage in a hotel, a restaurant, an office building, an event venue, or a complex facility.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A mobile robot control system configured to control a mobile robot, a shape of the mobile robot having long sides and short sides in a top view, and the mobile robot control system comprising:
a sensor configured to measure a distance from the mobile robot to a nearby object;
an area setting unit configured to set a virtual bumper area defined by a first area and a second area, the first area being defined by a plurality of circles arranged along the long-side direction and the second area being formed by moving the first area in accordance with a moving speed of the mobile robot, wherein when the mobile robot travels along a path to make a turn, a movement distance between a center of a first circle of the first area and a center of a second circle of the second area is set in accordance with the moving speed of the mobile robot, wherein the center of the second circle is on the path the mobile robot travels along to make the turn; and
a control unit configured to control the mobile robot so as to decelerate or stop when the nearby object is present in the virtual bumper area.

2. The mobile robot control system according to claim 1, further comprising a route setting unit configured to set a travelling route along which the mobile robot moves,
wherein the second area is an area formed by moving the first area along the travelling route by a distance corresponding to the moving speed of the mobile robot.

3. A mobile robot control method for controlling a mobile robot, a shape of the mobile robot having long sides and short sides in a top view, and the mobile robot control method comprising:
measuring a distance from the mobile robot to a nearby object based on a result of detection by a sensor;
setting a virtual bumper area defined by a first area and a second area, the first area being defined by a plurality of circles arranged along the long-side direction and the second area being formed by moving the first area in accordance with a moving speed of the mobile robot, wherein when the mobile robot travels along a path to make a turn, a movement distance between a center of a first circle of the first area and a center of a second circle of the second area is set in accordance with the moving speed of the mobile robot, wherein the center of the second circle is on the path the mobile robot travels along to make the turn; and
controlling the mobile robot so as to decelerate or stop when the nearby object is present in the virtual bumper area.

4. The mobile robot control method according to claim 3, further comprising setting a travelling route along which the mobile robot moves,
wherein the second area is an area formed by moving the first area along the travelling route by a distance corresponding to the moving speed of the mobile robot.

5. A non-transitory computer readable medium storing a program for causing a computer to execute a mobile robot control method for controlling a mobile robot, a shape of the mobile robot having long sides and short sides in a top view, and the mobile robot control method comprising:
measuring a distance from the mobile robot to a nearby object based on a result of detection by a sensor;
setting a virtual bumper area defined by a first area and a second area, the first area being defined by a plurality of circles arranged along the long-side direction and the second area being formed by moving the first area in accordance with a moving speed of the mobile robot, wherein when the mobile robot travels along a path to make a turn, a movement distance between a center of a first circle of the first area and a center of a second circle of the second area is set in accordance with the moving speed of the mobile robot, wherein the center of the second circle is on the path the mobile robot travels along to make the turn; and
controlling the mobile robot so as to decelerate or stop when the nearby object is present in the virtual bumper area.

6. The non-transitory computer readable medium according to claim 5, wherein
the mobile robot control method further comprises setting a travelling route along which the mobile robot moves, and
the second area is an area formed by moving the first area along the travelling route by a distance corresponding to the moving speed of the mobile robot.

* * * * *